United States Patent
Oh

(10) Patent No.: US 8,036,688 B2
(45) Date of Patent: Oct. 11, 2011

(54) MOBILE COMMUNICATION SYSTEM AND METHOD FOR SENDING GROUP SCHEDULE USING MOBILE TERMINAL

(75) Inventor: Chang-Seok Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 790 days.

(21) Appl. No.: 11/833,408

(22) Filed: Aug. 3, 2007

(65) Prior Publication Data

US 2008/0039123 A1 Feb. 14, 2008

(30) Foreign Application Priority Data

Aug. 11, 2006 (KR) ........................ 10-2006-0076412

(51) Int. Cl.
*H04W 4/00* (2009.01)
(52) U.S. Cl. ...................... 455/466; 455/406; 455/412.2; 455/415; 455/420; 455/518; 370/260; 370/432; 709/204
(58) Field of Classification Search .................. 455/466, 455/405–406, 412.1–412.2, 415–420, 452.1, 455/461, 514, 518–519; 370/260, 338, 349, 370/351, 432; 705/8; 709/204
See application file for complete search history.

(56) References Cited

U.S. PATENT DOCUMENTS

| | | | | |
|---|---|---|---|---|
| 5,819,261 A | * | 10/1998 | Takahashi et al. | ..................... 1/1 |
| 6,747,976 B1 | * | 6/2004 | Bensaou et al. | ........... 370/395.4 |
| 2004/0218744 A1 | * | 11/2004 | Nguyen et al. | ........... 379/202.01 |
| 2005/0136953 A1 | * | 6/2005 | Jo et al. | .......................... 455/466 |
| 2005/0233766 A1 | * | 10/2005 | Futami | ........................ 455/556.1 |
| 2007/0064908 A1 | * | 3/2007 | Levy et al. | ............... 379/211.03 |
| 2007/0153996 A1 | * | 7/2007 | Hansen | ..................... 379/114.29 |

FOREIGN PATENT DOCUMENTS

| | | |
|---|---|---|
| KR | 1020050008327 | 1/2005 |
| KR | 1020050093461 | 9/2005 |
| KR | 1020050095248 | 9/2005 |
| KR | 1020060057383 | 5/2006 |

* cited by examiner

*Primary Examiner* — Shaima Q Aminzay
(74) *Attorney, Agent, or Firm* — The Farrell Law Firm, P.C.

(57) ABSTRACT

Disclosed are a method and a mobile communication system for sharing at least one schedule between the members of a group. A user can first register one or more groups and members of each group, which will receive a group schedule, and store schedules in relation to corresponding groups in a master terminal. Each group schedule is stored with an identifier representing a specific group and indicating that the schedule is related to the specific group. When the user selects a group which will receive a group schedule in a schedule transmission mode, the master terminal extracts only the schedules related to the group using the identifier of the selected group, and sends the extracted schedules to every member of the selected group at one time. With a single transmission, every member of the group can share the schedules common to the group members.

6 Claims, 4 Drawing Sheets

MOBILE COMMUNICATION SYSTEM AND METHOD FOR SENDING GROUP SCHEDULE USING MOBILE TERMINAL

PRIORITY

This application claims priority to an application entitled "Mobile Communication System and Method for Sending Group Schedule Using Mobile Terminal" filed with the Korean Intellectual Property Office on Aug. 11, 2006 and assigned Serial No. 2006-76412, the disclosure of which is incorporated herein by reference.

BACKGROUND OF THE INVENTION

1. Field of the Invention

The present invention relates to a mobile terminal, and more particularly to a method for sending or receiving a schedule between a group of mobile terminals and a mobile communication system for implementing the method.

2. Description of the Related Art

With the development of wireless based technologies, mobile terminals have also been developed to provide advanced personal communication services. A large and ever-increasing number of private individuals presently possess mobile terminals. While quickly attaining popularity as a necessity among people of all ages, mobile terminals have gone beyond merely being telephones and now integrate various additional functions, such as an electronic scheduler. People with a modern, busy life-style are too busy to timely commence all of their tasks and often forget important tasks or appointments. To make sure everything gets done on time, they may write down their schedules in a to-do list or planner, but nevertheless may forget an important task or appointment. To meet the growing need for a personal schedule management, mobile terminals having a scheduling function have been developed.

Users can select a scheduling menu and input personal schedules for specified dates and times in mobile terminals. Also, the users can set a schedule alarm so that an alarm will be generated in a preset manner when an alarm time is reached on the date that is also specified. Simultaneously with the generation of an alarm, mobile terminals generally display a reminder of an upcoming schedule. Users can record anniversaries, birthdays of friends or family, and important dates or appointments as personal schedules in mobile terminals using the scheduling function, thereby assisting a user in timely accomplishing important things.

Among recorded scheduled events, national holidays and election dates are applicable to the general public. Also, a dinner with colleagues, a team meeting and a social gathering are scheduled events that are commonly shared by a specific group of people. Even for the schedules common to a group of people, each member of the group has to input and register the schedules in his or her own mobile terminal for the personal schedule management. A chief or leader of a specific group can inform each group member of a common schedule over the phone or using a Multimedia Message Service (MMS). For example, the chief of the group can input a message including information of the schedule using MMS, and repeat transmissions of the same message in the same number of the members of the group.

Also, in order to send a reminder of a scheduled event using MMS, a mobile user has to access a particular application and select the pertinent schedule from all the registered schedules. At this time, the selected schedule is converted into a file with a ".vcs" extension which can be attached to a file message or an email message.

According to a conventional method of file attachment, a user can select and attach only one scheduled event at a time. In order to send two or more scheduled events on a weekly or monthly basis, the user has to perform the file attachment two or more times.

As explained above, only one scheduled event can be selected and attached in each file attachment. To send two or more scheduled events to the members of a group, the user has to perform the file attachment two or more times. Moreover, a certain scheduled event may be omitted when file attachments are performed for many schedules.

SUMMARY OF THE INVENTION

Accordingly, the present invention has been made to solve the above-mentioned problems occurring in conventional systems, and an aspect of the present invention is to provide a method and a mobile communication system for easily sending a common schedule to every member of a group using a multimedia message service.

Another aspect of the present invention is to provide a method and a mobile communication system for easily sending a plurality of schedules to every member of a group at one time using a multimedia message service.

In order to accomplish the above, there is provided a method for sending a group schedule to a plurality of slave terminals from a master terminal, which includes registering schedules in relation to recipient group identifiers selected by a user in the master terminal; allowing the user to select a recipient group and a schedule period in a schedule transmission mode of the master terminal; extracting one or more schedules having a recipient group identifier corresponding to the selected recipient group and falling in the selected schedule period from the registered schedules; and sending the extracted schedules to slave terminals which belong to the selected recipient group.

In accordance with another aspect of the present invention, there is provided a mobile communication system for sending a group schedule, which includes a master terminal for registering schedules in relation to recipient group identifiers selected by a user, detecting when the user selects a recipient group and a schedule period in a schedule transmission mode, extracting one or more schedules having a recipient group identifier corresponding to the selected recipient group and falling in the selected schedule period from the registered schedules, and sending the extracted schedules; and a plurality of slave terminals for receiving the schedules from the master terminal and updating schedule information stored therein based on the received schedules.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
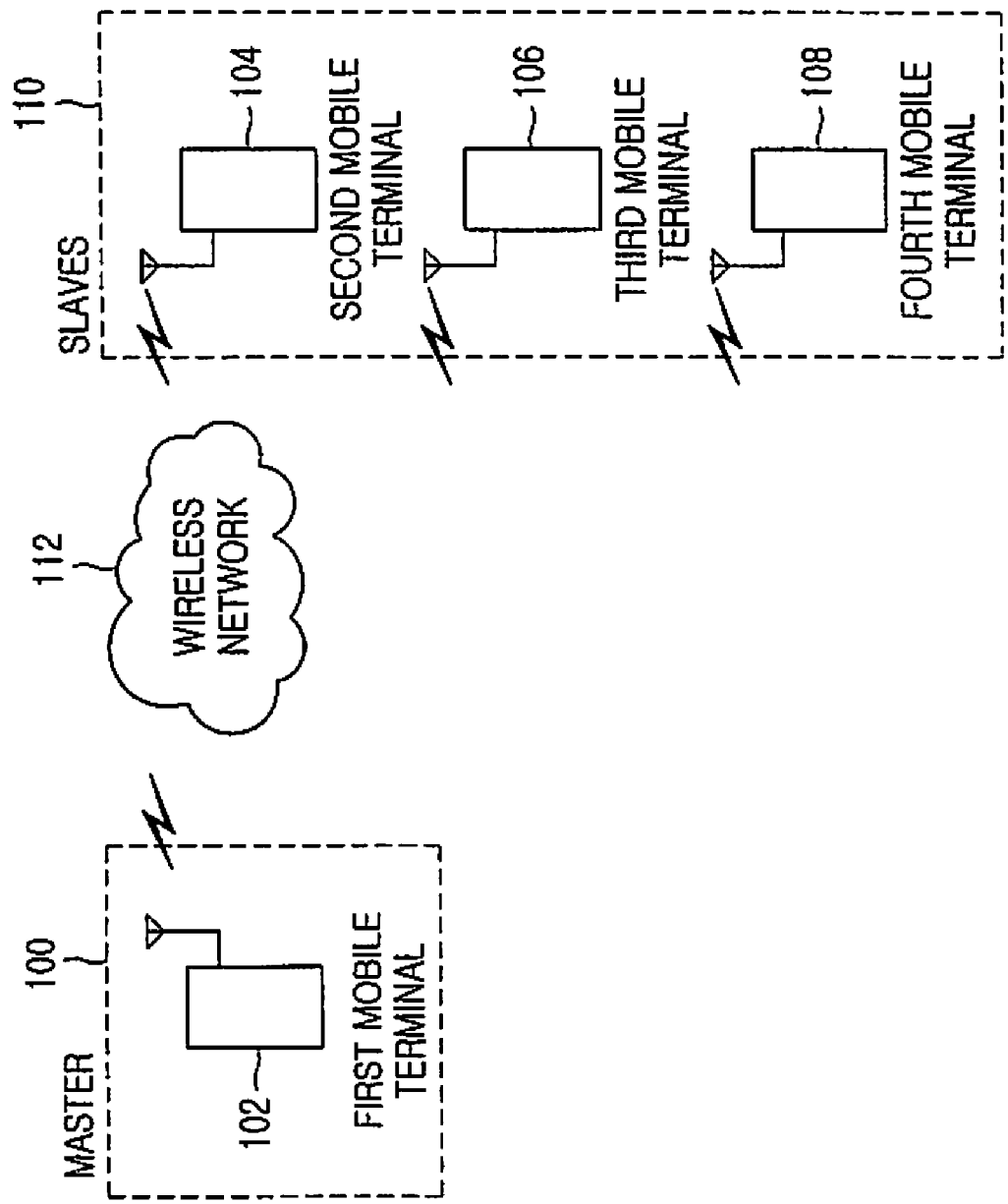
FIG. 1 is a view showing a mobile communication system including a plurality of mobile terminals for implementing a group scheduling function according to the present invention.

Hereinafter, preferred embodiments of the present invention will be described with reference to the accompanying drawings. In the drawings, the same element, although depicted in different drawings, will be designated by the same reference numeral. Also, in the following description of the present invention, a detailed description of known functions and configurations incorporated herein will be omitted when it may make the subject matter of the present invention unclear.

The present invention enables implementation of a function for sharing at least one schedule between all members of a group. A user can first register one or more groups and members of each group, which will receive a group schedule, and store schedules in relation to the corresponding groups in a master terminal. To be specific, each group schedule is stored with an identifier representing a specific group and indicating that the schedule is related to the specific group. When the user selects a group which will receive a group schedule in a schedule transmission mode, the master terminal extracts only the schedules related to the group using the identifier of the selected group, and sends the extracted schedules to the other members of the selected group at one time. With a single transmission, every member of the group can share the schedules common to the group members. Thus, the present invention enhances the users' convenience.

FIG. 1 is a view showing a mobile communication system including a plurality of mobile terminals for implementing a group scheduling function according to the present invention. A first mobile terminal 102 acts as a master terminal 100. It is assumed that the user of the first mobile terminal 102 is a member of a group who fixes group schedules and sends the fixed schedules to the other members of the group. The first mobile terminal 102, i.e. the master terminal 100, communicates with slave terminals 110 through a wireless network 112. When the user designates a group of which members will receive a group schedule, the master terminal 100 stores the designated group. At this time, one or more groups can be designated and stored in the master terminal 100.

When the user inputs a schedule in a schedule input mode, the master terminal 100 may generate a popup window to ask whether the inputted schedule should be stored in relation to a specific group. According to the answer inputted by the user, the master terminal 100 determines whether the schedule should be stored in relation to a specific group or as a general personal schedule. If the user selects a specific group, the master terminal 100 will store the inputted schedule in relation to the selected group. More specifically, the master terminal 100 will store the schedule with a group ID which is an identifier representing the selected group. The group ID can be set in a reserved field without any specific field added. Alternatively, the group ID can be added in front of a schedule title field by inserting a symbol designator (such as "(",")").

After registering schedules in relation to corresponding groups, the user can send at least one schedule of a specific group to all other members of the group using the MMS service. In this connection, the master terminal 100 displays a schedule transmission mode including a group selection item for selecting a group and a schedule period item for selecting schedules falling in a specific period.

According to the present invention, the user can select a daily, weekly, monthly, quarterly or annual schedule, which includes at least one sub-schedule, under the schedule period item. For example, if the user selects "group 1" under the group selection item and "week" under the schedule period item, the master terminal 100 will search for schedules having a group ID of group 1 and extract only those falling in the next week from the extracted schedules. Then the master terminal 100 will send the same extracted schedules to the other members of group 1 using MMS. The schedules are converted into a format transmittable via MMS, for example, a .vcs file format, for the compatibility with the slave terminals of the other members, or with an email client such as Microsoft Outlook. Consequently, every member of group 1 can share the same group schedules.

According to another embodiment of the present invention, the user can send schedules of a specific period to a recipient other than the members of a group at one time. To this end, schedules can be registered with a recipient ID, rather than a group ID. When the user selects a specific recipient ID and a specific schedule period in the schedule transmission mode, the master terminal 100 extracts only the schedules having the selected recipient ID and falling in the selected period, and sends the extracted schedules to the desired recipient.

The slave terminals 110, i.e. the second mobile terminal 104, third mobile terminal 106 and fourth mobile terminal 108, receive a schedule from the master terminal 100. The slave terminals 100 compare the schedule information stored in their own memories with the received schedule, and update the schedule information accordingly. At this time, the slave terminals 110 can obtain the group ID by parsing the schedule title field or the reserved field.

If the slave terminals 110 are set to implement an automatic schedule reflecting function, they will read the group ID from the received schedule, i.e. the .vcs file, and will reflect the received group schedule to the schedule of a specific organizer application.

Figure 2:
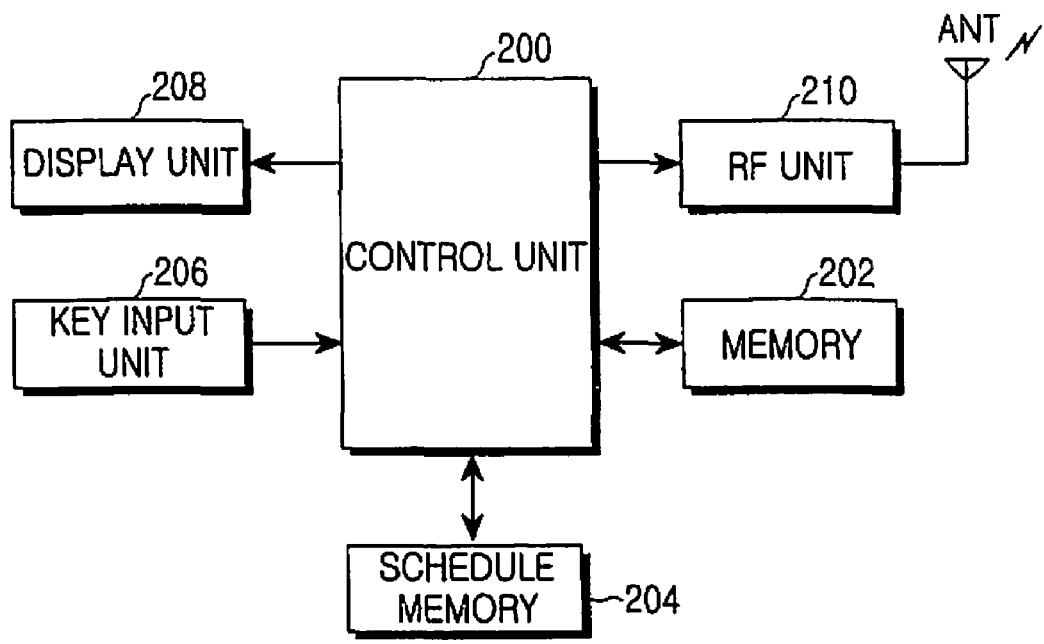
FIG. 2 is a block diagram showing the configuration of a mobile terminal according to the present invention.

FIG. 2 is a block diagram showing the configuration of a mobile terminal according to the present invention. A control unit 200 processes and controls telephone calls, messages and data communications. In a mobile terminal which acts as a master terminal (or which is used by a member of a group who fixes a group schedule), the control unit 200 will perform the following operations.

The control unit 200 sends a group schedule message to the slave terminals 110 of the group using MMS format so that the slave terminals 110 can update the schedule information stored therein and share the group schedule. In order to generate a group schedule message, the control unit 200 implements a schedule input mode in which the user can input a schedule and register the inputted schedule with a designated group ID. Also, the control unit 200 implements a schedule transmission mode in which the user can send one or more group schedules falling in a designated period at one time.

In a mobile terminal which acts as a slave terminal 110, the control unit 200 will perform the following operations.

When receiving a schedule message from the master terminal 100, the control unit 200 of a slave terminal 110 compares the schedule information stored in a schedule memory 204 with the received schedule information in order to determine whether the received schedule can be registered directly. In other words, the control unit 200 determines whether the automatic schedule reflecting function is set in the slave terminal 110. If the function is set, the control unit 200 will update the stored schedules of the dates falling in the period included in the received schedule information.

An RF unit 210 is controlled by the control unit 200. When receiving a signal in a frequency bandwidth through an antenna ANT, the RF unit 202 converts the signal and outputs the signal to the control unit 200 with identification of the data type of the signal. Data output to the control unit 200 from the RF unit 202 can be text data, a paging signal received through a paging channel, or a signaling signal.

A memory 202 stores programs implemented by the control unit 200 and temporarily stores data processed by the programs. Also, the memory 202 stores received short messages or a table of telephone numbers. The memory 202 comprises a Read Only Memory (ROM) for storing operation programs and an Electrically Erasable Programmable ROM (EEPROM) and a Random Access Memory (RAM).

A schedule memory 204 stores schedule information generated or changed by the user or updated according to the received schedule information. A key input unit 206 is provided with a plurality of alphanumeric keys and function keys. The key input unit 206 applies data generated by a key input to the control unit 200. A display unit 208 displays various operational states of the mobile terminal under the control of the control unit 200.

Figure 3:
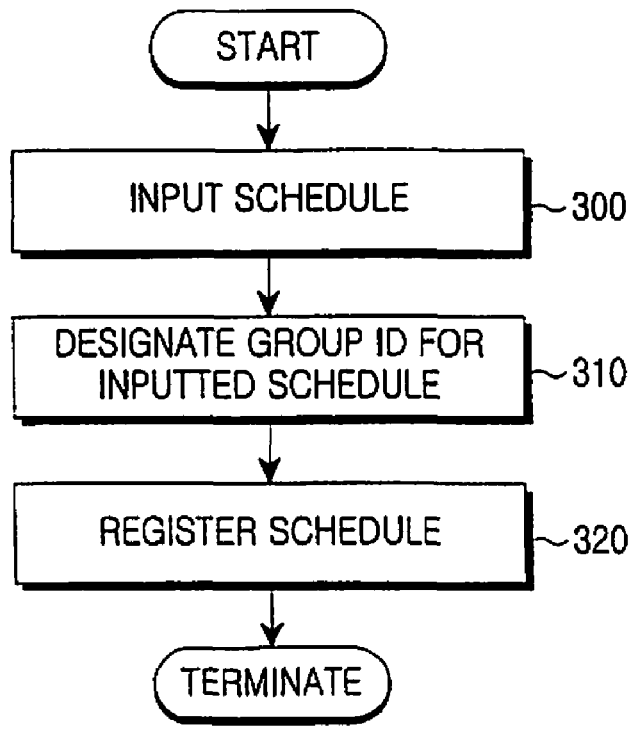
FIG. 3 is a flowchart showing a process of registering a group schedule according to the present invention.

Hereinafter, a process for registering a group schedule in a master terminal according to the present invention is explained in detail with reference to FIG. 3. In the following explanation, it is assumed that the first mobile terminal 102 is a master terminal 100 and the second and third mobile terminals 104 and 106 are slave terminals 110.

In the schedule input mode of the master terminal 100, the user can input a schedule in step 300. Before registering the schedule, the user can designate a group ID which will be added to the schedule in step 310. Then the master terminal 100 registers the input schedule with the designated group ID in step 320.

When one or more group schedules are registered, the user can select a desired schedule of a specific group and send it to the other members of the group.

Figure 4:
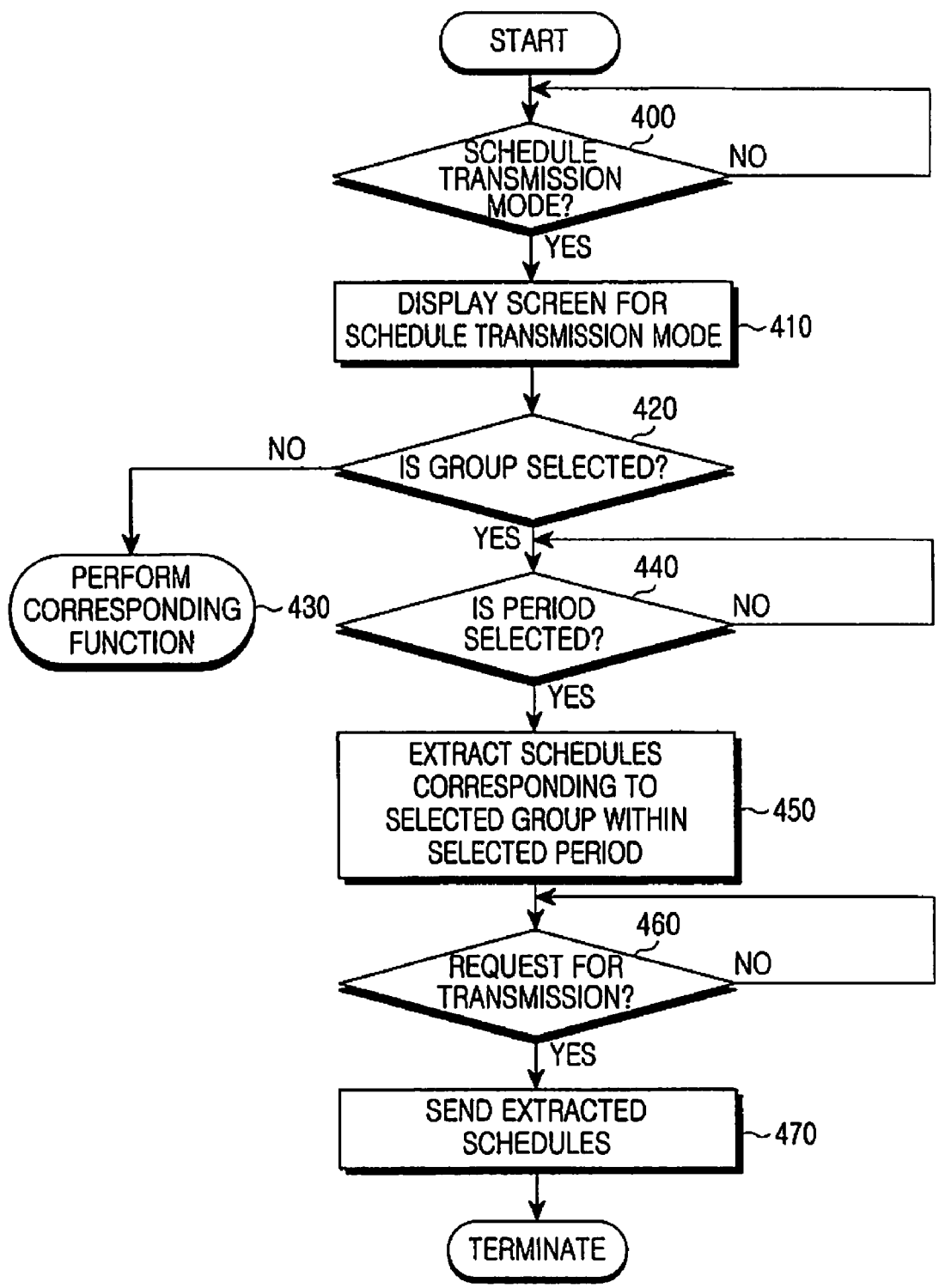
FIG. 4 is a flowchart showing a process of sending a group schedule according to the present invention.
Figure 5:
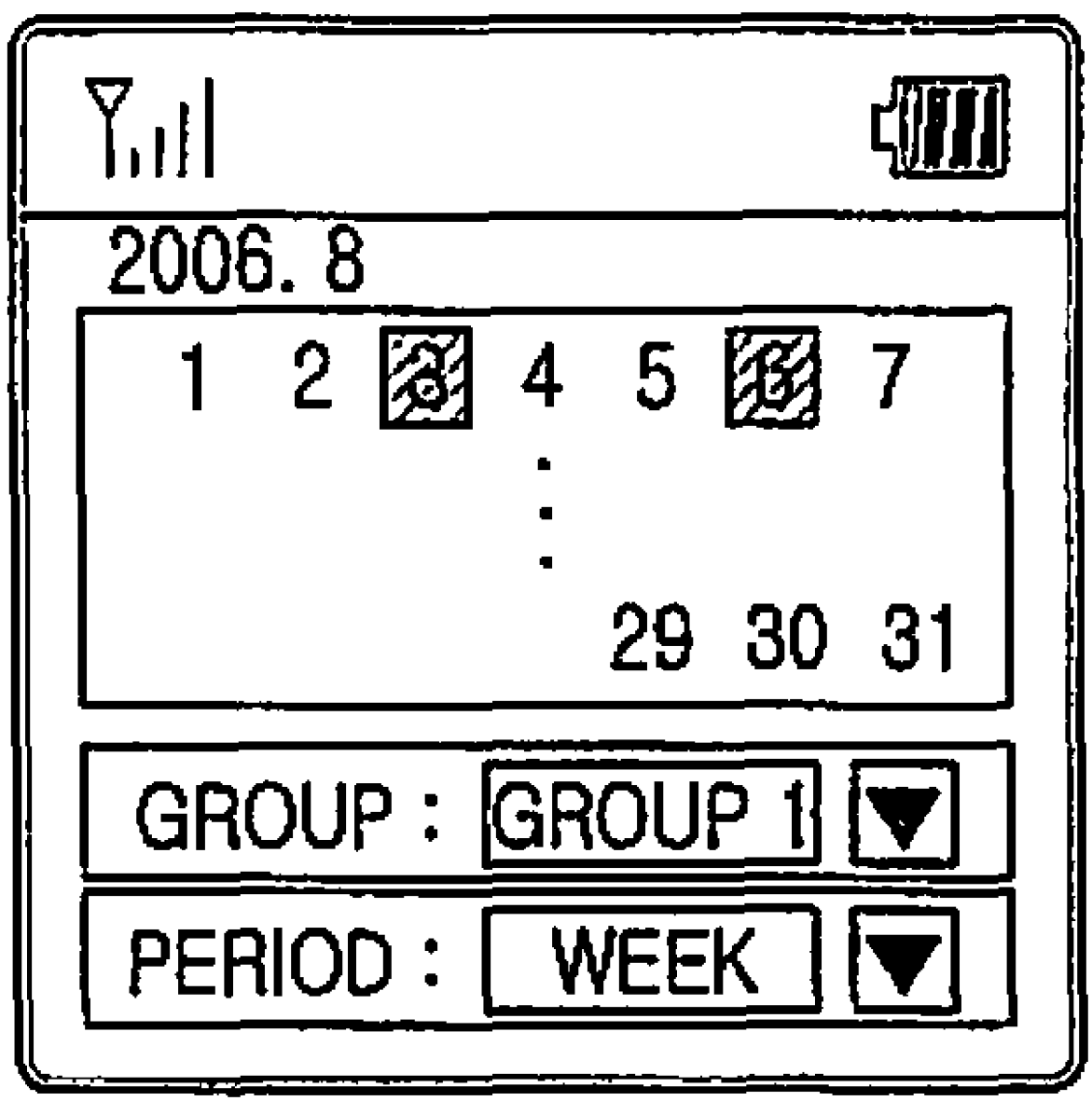
FIG. 5 illustrates an example display of a schedule transmission mode according to the present invention.

A process of sending a group schedule to the slave terminals from the master terminal is explained in detail with reference to FIG. 4. In step 400, the master terminal 100 determines whether the user inputs a request for changing the current mode to the schedule transmission mode. When the request is input, the master terminal 100 proceeds to step 410 in order to display a screen for a schedule transmission mode. As illustrated in FIG. 5, the schedule transmission mode includes a group selection item and a schedule period item. In the schedule transmission mode, the user can select a group which will receive schedules and a period of which schedules will be sent.

In step 420, the master terminal 100 determines whether the user selects a group which will receive the schedules in the schedule transmission mode, as illustrated in FIG. 5. If a group is not selected, the master terminal 100 will recognize that the schedules will not be sent to the members of a specific group, and will perform a corresponding function in step 430. If a specific group is selected, the master terminal 100 will determine whether the user selects a period in step 440. The user can select a daily, weekly, monthly, quarterly or annual schedule, which may include a plurality of sub-schedules, under the schedule period item, and set the plurality of sub-schedules altogether at one time.

When the schedule period is selected, the master terminal 100 proceeds to step 450 in order to extract one or more schedules corresponding to a selected group within the selected period. More specifically, the master terminal extracts those schedules from the previously registered schedules based on a group ID corresponding to the selected group. At this time, the master terminal 100 extracts only the schedules falling in the period selected by the user. For example, if the user selects "week" under the schedule period item, the master terminal 100 will extract only the schedules falling in the next week. In step 460, the master terminal 100 detects whether the user inputs a request for sending the extracted schedules. If the request is input, the master terminal will proceed to step 470 in order to send the extracted schedules to the other members of the selected group. The extracted group schedules are transmitted in a .vcs file format to the slave terminals 110 via MMS. The master terminal 100 may have a transmission reservation function for transmitting the extracted schedules at a time specified. If the transmission reservation function is available, the user can more easily send group schedules on a daily, weekly, monthly, quarterly or annual basis.

As explained above, the present invention provides a method and a system for sending a plurality of schedules of a group at one time, which reduces time and effort to send the schedules one after another and repeatedly send the same schedules to each member of the group. The slave terminals automatically update the schedule information stored therein according to the schedules received from the master terminal, thereby improving user convenience.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for sending a group schedule to a plurality of slave terminals by a master terminal, the method comprising the steps of:
   receiving a recipient group from a user before registering a schedule in the master terminal;
   registering the schedule in relation to a recipient group identifier corresponding to the recipient group received from the user;
   extracting at least one schedule from registered schedules when a the recipient group and a schedule period are selected by the user, wherein the at least one schedule has the recipient group identifier corresponding to the selected recipient group and falls within the selected schedule period; and
   sending the extracted schedules to slave terminals which belong to a selected recipient group.

2. The method according to claim 1, wherein registering the schedules includes:
   inputting the schedule;
   designating a group identifier for the input schedule; and
   registering the schedule with the designated group identifier.

3. The method according to claim 2, wherein the extracting step only extracts the schedule having the group identifier selected by the user.

4. The method according to claim 1, wherein the extracted schedule is transmitted using a multimedia message service.

5. The method according to claim 2, wherein sending the extracted schedule to the plurality of slave terminals sends the extracted schedule to the plurality of slave terminals corresponding to the group identifier designated by the user.

6. The method according to claim 1, wherein the schedule period is any one of a day, week, month, quarter or year.

* * * * *